March 7, 1961

J. B. KENNON 2,974,278

ELECTRICAL TESTING DEVICES FOR DETECTING
AND LOCATING FAULTS IN CIRCUITS

Filed Jan. 25, 1960

INVENTOR
JOHN B. KENNON
BY *Robb & Robb*
ATTORNEYS

United States Patent Office 2,974,278
Patented Mar. 7, 1961

2,974,278

ELECTRICAL TESTING DEVICES FOR DETECTING AND LOCATING FAULTS IN CIRCUITS

John B. Kennon, 330 Gertrude St., Syracuse, N.Y., assignor of one-half to Charles E. Wright, Syracuse, N.Y.

Filed Jan. 25, 1960, Ser. No. 4,330

6 Claims. (Cl. 324—52)

This invention relates to electrical testing devices for detecting and indicating broken, open or shorted electric circuits in all form of electrical circuits and/or electronic devices.

An object of the invention is to provide an electrical testing device that is portable and may be carried in the pocket, leaving both hands free for the handling of repair tools and the like.

A further object of the invention is to provide an electrical testing device which does not require the operations of manual point-to-point testing, using one or more probes for establishing a mechanical contact with the circuit to be tested.

A still further object of the invention is to provide a sensitive electrical testing device which will pick up interference caused by faulty circuits and suitably amplify it for recognition.

Heretofore, the approximate locations of short circuits and the like in electric lines have been determined by means of "Wheatstone" bridge testers. This operation requires the making of mechanical connections to the lines or apparatus to be test. In the present invention, no mechanical attachments are necessary, since the device is very sensitive and will pick up an electrical fault over a considerable distance. The testing unit is self-contained and preferably makes use of hearing-aid types of apparatus for extreme portability which allows a repairman to place one of the devices in his pocket and move about an area until the defect is found. As the repairman moves about, a sound heard in the receiver of the test unit indicating a fault, will become louder as he nears the source of trouble.

A search coil for picking up the defects is utilized in my tester device, preferably comprising a pancake type coil generally having a comparatively large number of turns of fine wire, such as No. 46 wire. The search or pick-up coil is connected in series with a small neon lamp and its energy is fed into the input of an audio amplifier. The output of the amplifier is connected to an inductance coil which is wound around the outside envelope of the neon tube to provide a form of feedback for reinforcing the input signals.

As the amplified signal in the output of the amplifier varies, it ionizes the gas in the neon tube by means of the inductance surrounding the tube and provides additional electrical energy to further build up the weak signals in the pick-up coil. The gas in the neon tube is ionized in direct proportion to the incoming signals.

The above and other features and advantages of the invention will be understood by reference to the accompanying drawing which illustrates typical embodiments of the invention.

Figure 1:
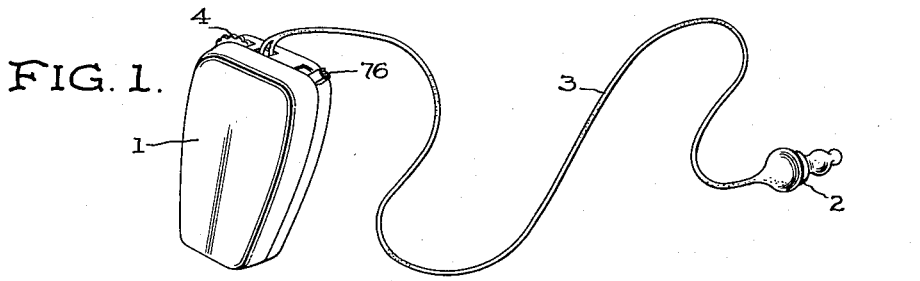
Figure 1 illustrates the invention as mounted in a portable case, similar in size and weight as that used for hearing aids and the like, together with an attached headphone or ear-piece unit.

Referring specifically to Figure 1, a housing 1, constructed of a suitable plastic or other appropriate material is preferably used to contain all of the components of the invention, with the exception of a headphone or ear-piece unit 2 which is of the type to fit comfortably and snugly in or on the ear. The headphone is connected to the amplifier by means of insulated flexible copper wires 3. An on-off switch and volume control 4 provides a single control for connecting and disconnecting the battery or batteries in the device and also to regulate the volume to a comfortable listening level.

Figure 2:
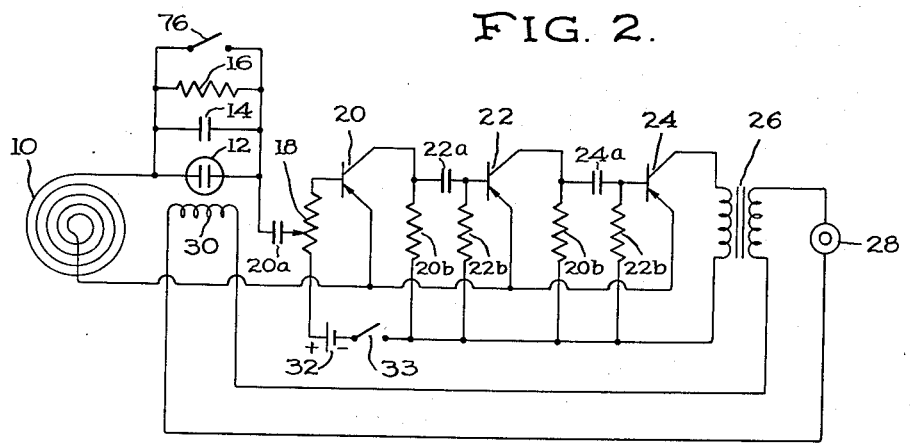
Figure 2 illustrates the invention in schematic form when transistors are used in the audio amplifier.

Passing now to the circuit diagram of Figure 2, a pancake type pick-up coil 10 of the type previously referred to, is connected in series with a small neon tube 12, a fixed condenser 14 having a capacitance of about .00025 mfd., and a fixed resistor 16 of about 50 megohms, the neon tube, condenser and resistor being themselves connected in parallel. These components are connected to the input of an audio amplifier, one of the connections being applied to a variable resistor 18 which forms a part of the first stage of the transistor amplifier. The amplifier consists of 3 PNP type transistors 20, 22 and 24 in a resistance coupled circuitry of the conventional type containing the usual coupling condensers 20a, 22a and 24a, as well as collector resistors 20b and base resistors 22b. An output transformer 26 has its secondary connected in series with a headphone unit 28 and a feedback inductance coil 30 having approximately 10 turns of No. 30 DCC wire. A battery 32 and an on-off switch 33 completes the circuit.

For purposes of rendering ineffective the feedback arrangement of the neon tube 12 and associated condenser 14 and resistor 16, a shunting switch 76 is used to short-circuit these elements and eliminate the feedback action when desired.

Figure 3:
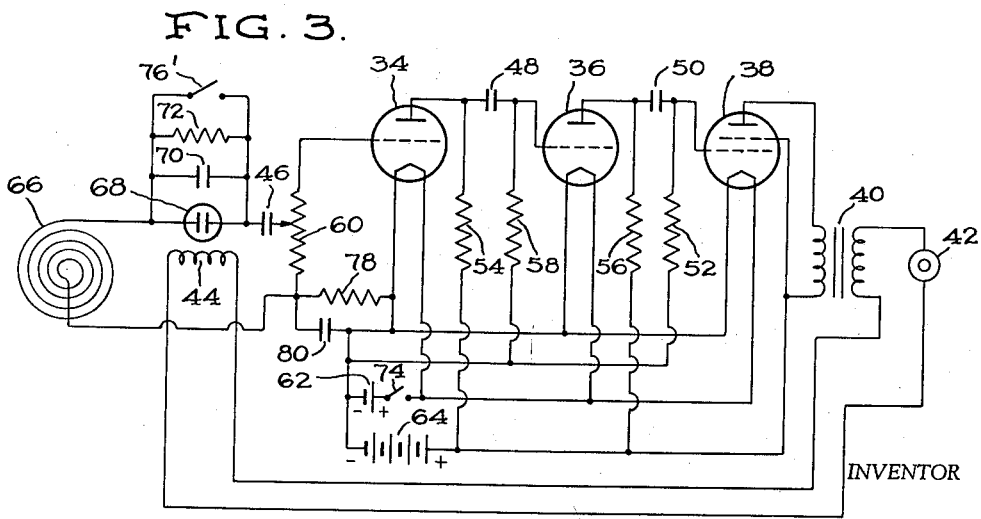
Figure 3 illustrates the invention in schematic form when vacuum tubes are used in the audio amplifier.

Figure 3 is an alternate form of the invention showing the use of vacuum tubes in lieu of transistors. The tubes are similar to those employed in a conventional type of hearing aid. As shown in the drawing, the input to the amplifier is substantially the same as shown in the transistor amplifier hereinbefore described, the pick-up coil 66 and neon tube 68, the latter shunted with a fixed resistor 72 and capacitor 70, being connected in a series circuit. The vacuum tubes 34 and 36 in the first and second stages are of the triode type, while the output tube 38 is a pentode. The output transformer 40 is also connected in series with a headphone 42 and a feedback inductance coil 44. Suitable coupling condensers 46, 48 and 50 are used between the respective stages of the amplifier. The usual plate resistors 54 and 56, as well as grid resistors 52, 58 and 60, are employed. An "A" battery 62 and a "B" battery 64 supply the power needed to operate the amplifier.

The pick-up coil 66 is connected in a series circuit with the parallel arrangement of neon tube 68, fixed capacitor 70 and fixed resistor 72. A switch 74 in the filament circuit serves to render the amplifier operative or inoperative. A switch 76' serves to shunt out the neon tube 68, resistor 70 and capacitor 72 from the circuit if not needed when in very strong signal areas or for any other reason when the feedback feature is not desired. A biasing resistor 78 and a by-pass condenser 80 of conventional type are also used in the first amplifying stage for vacuum tube 34.

In operation of the circuit of Figure 2, when a signal is picked up by the pick-up coil 10, it passes through the neon tube 12, which acts as a variable impedance, from whence the signal goes into the main amplifier through the volume control 18. To permit the flow of current through the neon tube, the gas in the neon tube must become ionized. To start ionization, the feedback coil 30 is wound around the outside envelope of the neon tube and this coil is connected to the secondary winding of the output transformer 26 which is also connected in series with the headphone 28 forming a complete series circuit with these components. When a signal is picked up by the coil 10 and amplified by the amplifier, the signal from the output transformer is fed to the feedback coil which acts as an exciter and creates a concentrated magnetic field in the neon tube and causes the gas therein to become ionized in direct proportion to the received signal. These lines of magnetic energy passing through the gas and into the input of the amplifier produce a large gain in power.

The signal current passing through the primary of the output transformer produces an electrostatic current in the secondary winding. This occurs when the case of the transformer is not grounded and this is the effect used to ionize the neon tube which is in series with the headphone.

The operation of the circuit of Figure 3 is generally similar to that of Figure 2 as described in the foregoing, and therefore will be readily understood without repetition.

While the specific details have been herein shown and described the invention is not confined thereto as changes and alterations may be made without departing from the spirit thereof as defined in the appended claims.

I claim:

1. A testing instrument for detecting and locating faults in electrical circuits and the like, comprising a pick-up coil, an amplifier, an output transformer in series connection with a feedback coil, a neon tube in series connection with said pick-up coil, with the neon tube positioned in inductive relation to the feedback coil and constituting therewith a variable impedance said neon tube being connected to the input of said amplifier, and means connected in circuit with the amplifier output and with the feedback coil for producing signal indications responsive to faults detected by the pick-up coil.

2. Apparatus as defined in claim 1, wherein the means connected in circuit with the amplifier output and with the feedback coil for producing signal indications responsive to faults detected by the pick-up coil comprises a transducer for producing audible signals.

3. Apparatus as defined in claim 1, wherein the amplifier components are of miniature size to provide compact self-contained apparatus that may be carried in a garment pocket on the person.

4. A testing instrument for detecting and locating faults in electrical circuits and the like, comprising a pick-up coil, an amplifier, an output transformer in series connection with a feedback coil, a neon tube in series connection with said pick-up coil, with the neon tube positioned in inductive relation to the feedback coil and constituting therewith a variable impedance said neon tube being connected to the input of said amplifier, a capacitor and resistance in parallel connection with said neon tube, and means connected in circuit with the amplifier output and with the feedback coil for producing signal indications responsive to faults detected by the pick-up coil.

5. Apparatus as defined in claim 4, wherein means are provided to render the signal feedback means inoperative, said means comprising a switch for shunting out of circuit the neon tube, resistor and capacitor of said feedback circuit.

6. A testing instrument for detecting and locating faults in electrical circuits and the like, comprising a pancake type pick-up coil, a neon tube, a multistage transistor amplifier, an output transformer, a headphone unit, a feedback coil wound around the neon tube, a capacitor, resistor and switch in parallel connection with said neon tube, said pick-up coil, neon tube with capacitor, resistor and switch being disposed in series connection and connected to the input of said amplifier, said headphone unit and feedback coil being disposed in series connection with the secondary of said output transfer for producing audible signals in said headphone unit, and the primary winding of said output transformer being connected to the last stage of the said amplifier.

References Cited in the file of this patent

UNITED STATES PATENTS

| 1,984,499 | St. Laurent | Dec. 18, 1934 |
| 2,207,509 | Fewings | July 9, 1940 |
| 2,769,868 | Brownlow | Nov. 6, 1956 |